United States Patent
Paczia et al.

(10) Patent No.: US 12,545,260 B2
(45) Date of Patent: Feb. 10, 2026

(54) METHOD OF PLANNING A LANE CHANGE MANEUVER FOR AN AUTOMATED VEHICLE

(71) Applicant: MERCEDES-BENZ GROUP AG, Stuttgart (DE)

(72) Inventors: Jonas Paczia, Stuttgart (DE); Hubert Rehborn, Sindelfingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 9 days.

(21) Appl. No.: 18/832,183

(22) PCT Filed: Dec. 6, 2022

(86) PCT No.: PCT/EP2022/084571
§ 371 (c)(1),
(2) Date: Jul. 23, 2024

(87) PCT Pub. No.: WO2023/138827
PCT Pub. Date: Jul. 27, 2023

(65) Prior Publication Data
US 2025/0115243 A1    Apr. 10, 2025

(30) Foreign Application Priority Data
Jan. 24, 2022 (DE) ..................... 10 2022 000 231.0

(51) Int. Cl.
*B60W 30/18* (2012.01)
*G08G 1/0967* (2006.01)
*G08G 1/16* (2006.01)

(52) U.S. Cl.
CPC . *B60W 30/18163* (2013.01); *G08G 1/096708* (2013.01); *G08G 1/096791* (2013.01);
(Continued)

(58) Field of Classification Search
CPC ....... B60W 30/18163; B60W 2556/45; B60W 2554/406; G08G 1/096708; G08G 1/096791; G08G 1/167
See application file for complete search history.

(56) References Cited

U.S. PATENT DOCUMENTS

| | | | |
|---|---|---|---|
| 11,639,185 B2* | 5/2023 | Beaurepaire | G08G 1/22 701/26 |
| 2019/0019416 A1* | 1/2019 | Perko | G05D 1/0011 |

(Continued)

FOREIGN PATENT DOCUMENTS

| | | |
|---|---|---|
| DE | 102014000843 A1 | 8/2014 |
| DE | 102017219471 A1 | 5/2019 |

(Continued)

OTHER PUBLICATIONS

International Search Report and Written Opinion mailed Mar. 24, 2023 in related/corresponding International Application No. PCT/EP2022/084571.

(Continued)

*Primary Examiner* — Peter D Nolan
*Assistant Examiner* — Wae L Louie
(74) *Attorney, Agent, or Firm* — PATENT PORTFOLIO BUILDERS PLLC

(57) ABSTRACT

A method of planning a lane change maneuver from one lane to an outer lane to prepare for an approaching exit from a multi-laned section of road for an automated vehicle is provided. The vehicle is or can be coupled to a central computer for data exchange. Traffic data representing a local traffic volume on the multi-laned section of road is received by the central computer. Lane change data about planned and successfully carried out automated lane change maneuvers is received from other automated vehicles of a vehicle fleet by the central computer. A probability of the vehicle being able to carry out an automated lane change maneuver (Continued)

at a particular position given a current traffic volume is determined by the central computer using received traffic data and received lane change data.

11 Claims, 1 Drawing Sheet

(52) U.S. Cl.
CPC ....... *G08G 1/167* (2013.01); *B60W 2554/406* (2020.02); *B60W 2556/45* (2020.02)

(56) References Cited

U.S. PATENT DOCUMENTS

| | | | | |
|---|---|---|---|---|
| 2019/0049981 | A1* | 2/2019 | Fischer | B60W 50/08 |
| 2021/0200212 | A1* | 7/2021 | Urtasun | G05D 1/0214 |
| 2021/0253128 | A1* | 8/2021 | Nister | B60W 50/0097 |
| 2021/0300371 | A1* | 9/2021 | Sindhuja | B60W 60/001 |
| 2022/0036173 | A1* | 2/2022 | Wulfe | G05D 1/0221 |
| 2022/0119010 | A1* | 4/2022 | Beaurepaire | G08G 1/22 |
| 2022/0119012 | A1* | 4/2022 | Agon | G06V 20/56 |
| 2022/0126831 | A1* | 4/2022 | Foil | G01S 13/723 |
| 2025/0115243 | A1* | 4/2025 | Paczia | G08G 1/096775 |
| 2025/0214617 | A1* | 7/2025 | Gazepi | B60W 60/0011 |
| 2025/0276714 | A1* | 9/2025 | Ainampudi | B60W 60/001 |
| 2025/0301284 | A1* | 9/2025 | Ucar | H04W 4/021 |

FOREIGN PATENT DOCUMENTS

| | | |
|---|---|---|
| DE | 102017221104 A1 | 5/2019 |
| DE | 102018200937 A1 | 7/2019 |
| DE | 102018211236 A1 | 1/2020 |
| DE | 102019005446 B3 | 12/2020 |
| DE | 102016122686 B4 | 1/2021 |
| DE | 102020117160 B3 | 10/2021 |
| DE | 102020117159 A1 | 12/2021 |

OTHER PUBLICATIONS

Office Action created Aug. 12, 2022 in related/corresponding DE Application No. 10 2022 000 231.0.

* cited by examiner

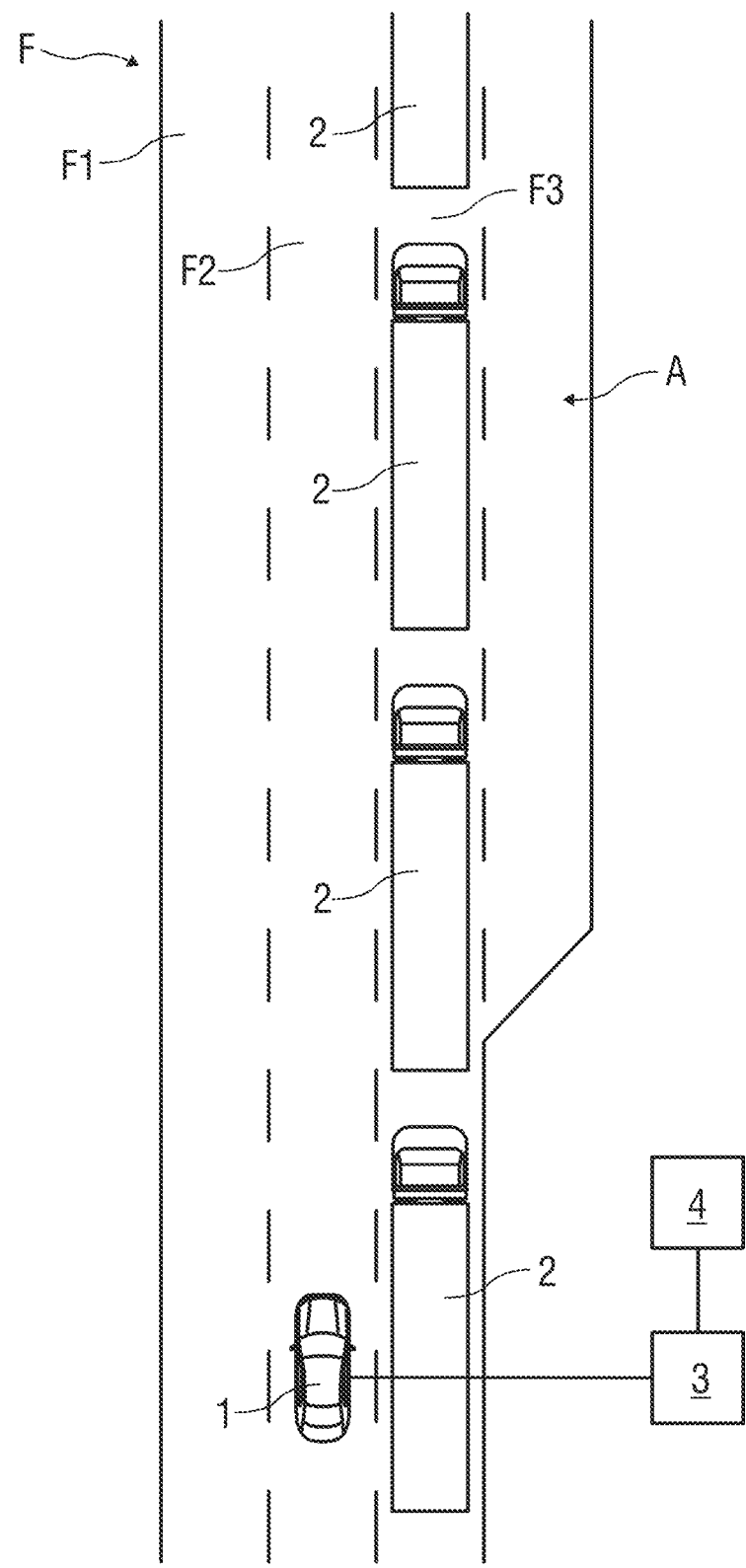

METHOD OF PLANNING A LANE CHANGE MANEUVER FOR AN AUTOMATED VEHICLE

BACKGROUND AND SUMMARY OF THE INVENTION

Exemplary embodiments of the invention relate to a method of planning a lane change maneuver from one lane to an outer lane to prepare for an approaching exit from a multi-laned section of road for an automated vehicle, wherein the vehicle is or can be coupled to a central computer for data exchange.

A method for automated merging of a vehicle from a merging lane into a driving lane is known from DE 10 2019 005 446 B3. The method provides that a primary merging position at which the vehicle should perform a lane change from the merging lane into the driving lane is pre-determined. If the lane change in or near the primary merging position does not hinder the traffic participants in the driving lane in any way, the vehicle is controlled such that the lane change is carried out in the primary merging position. Otherwise, the lane change is carried out in a secondary merging position, which is determined depending on detected free spaces between traffic participants in the driving lane.

In addition, DE 10 2017 221 104 A1 describes a method of coordinating at least one spacing between at least two autonomous or partially autonomous vehicles in a vehicle network, wherein at least one slip road and/or exit of a road being driven along by the at least two vehicles is registered in a region in front of the vehicle network, a situation-dependent optimal spacing between the at least two vehicles when passing the slip road and/or exit is determined, a distance between the at least two vehicles is adjusted to the situation-dependent optimal spacing between the at least two vehicles before they reach the slip road and/or exit, the slip road and/or exit is passed with the determined situation-dependent optimal spacing between the at least two vehicles, a situation-dependent optimal spacing between the at least two vehicles is determined again after they pass the slip road and/or exit, and the distance between the at least two vehicles is adjusted to the newly determined situation-dependent optimal spacing between the at least two vehicles after the slip road and/or exit has been passed.

Exemplary embodiments of the invention are directed to a method of planning a lane change maneuver for an automated vehicle.

A method of planning a lane change maneuver from one lane to an outer lane to prepare for an approaching exit from a multi-laned section of road for an automated vehicle, wherein the vehicle is or can be coupled to a central computer for data exchange, provides according to the invention that data representing a local traffic volume on the multi-laned section of road is received by means of the central computer. In addition, lane change data of other automated vehicles of the vehicle fleet concerning planned and successfully carried out automated lane change maneuvers is received by means of the central computer, and a probability of the vehicle being able to carry out an automated lane change maneuver at a particular position given a current traffic volume is determined by means of the central computer using received traffic data and received lane change data.

By an outer lane, a right lane is meant in right-hand traffic, and a left lane is meant in left-hand traffic, in particular a right or left lane of a motorway.

By using the method, a position is determined at which the automated vehicle initiates a lane change maneuver to switch to the outer lane, such that it is possible to exit the motorway while adhering to legal requirements and technical constraints.

By means of the method, a traffic flow can be improved, because using the method, automated vehicles carry out a lane change maneuver at the right time to exit the respective motorway. Thus, it is not necessary for the respective automated vehicle to perceive a comparatively short time gap or for the vehicle to be required to be manually operated by an occupant, i.e., a driver, in order to reach the exit of the motorway in time. If the method is used, traffic safety and driving comfort can be increased.

Compared to a solution based on vehicle-to-vehicle communication, the method according to the invention is substantially independent of a behavior of other traffic participants. Both technical complexity and a need to be dependent on the cooperation of other vehicle manufacturers and/or traffic participants can thus be reduced.

In particular, by using the method, it can be made easier for automated vehicles to leave a motorway at an exit, e.g., by early merging into the outer lane. These comparatively early merging positions in the outer lane can, for example, be established from vehicle fleets of automated vehicles that have successfully left a motorway via an exit without a driver intervention. In addition, a position at which a human driver usually switches to the outer lane to exit the motorway at an exit can be determined from a vehicle fleet. A position for initiating the lane change maneuver of the automated vehicles at a parameterizable larger distance of, for example, 300 m before the exit can be established from the technical constraints of automated vehicles.

In other words, by using a spatial-temporal investigation of lane change maneuvers of other, networked automated vehicles at motorway exits by means of a service of the central computer, the method serves to significantly reduce the risk of an exit being passed and to increase safety and driver comfort during the lane change maneuver. A point in time for a lane change maneuver can be dynamically determined using the lane change data and the traffic data.

In one embodiment of the method, the lane change data transmitted from the other automated vehicles of the vehicle fleet to the central computer contains lane change location information and lane change success information, which is transmitted from the other automated vehicles of the vehicle fleet to the central computer. The lane change data of the further vehicles thus contains sufficient information to determine the position that is suitable for the automated vehicle to initiate the lane change maneuver, so that the vehicle can use the next exit largely without danger. In particular, the position is selected using the present lane change data such that the lane change maneuver is not initiated abruptly, but instead gradually and in a manner adjusted to a traffic situation, so that driving comfort for occupants of the vehicle is not negatively affected before and during the lane change maneuver.

One embodiment of the method provides that a location at which the lane change maneuver of the respective other automated vehicle of the vehicle fleet was initiated is specified by means of the lane change location information. The lane change data thus contains information about where exactly the respective other automated vehicle has initiated its lane change maneuver to change from its current lane to the outer lane.

In one embodiment, whether the lane change maneuver of the respective other automated vehicle of the vehicle fleet was carried out successfully or had to be terminated prematurely, for example because a takeover request in relation to a driving task of the vehicle was output to a driver, is specified by means of the lane change success information. A position, in particular a position recorded using a satellite, for a beginning, i.e., the initiation, of the lane change maneuver can be determined using a determined spatial distribution of successfully carried out lane change maneuvers. In particular, the position is determined at which the automated lane change maneuver can be successfully carried out with a parameterizable probability before exiting the motorway.

In a further embodiment of the method, the initiation of a lane change maneuver is recognized by a direction of travel indicator of the automated vehicle being set. Setting the direction of travel indicator serves as the beginning of the lane change maneuver, and a transmission of the lane change data to the central computer is triggered. The initiation of the lane change maneuver of the respective other automated vehicle is also recognized by the direction of travel indicator being set.

For this purpose, in a further possible embodiment, a current position of the vehicle and of the respective further vehicle at the point in time at which the direction of travel indicator is set is recorded and is transmitted to the central computer. This current position and the point in time then serve as the determined spatial-temporal position of the initiation of the lane change maneuver of the automated vehicle.

In one possible embodiment of the method, the traffic data is transmitted to the central computer, in particular continuously, at least at regular temporal intervals, by means of a traffic service and/or a navigation service. Relatively current traffic data is thus always available to the central computer, which data is used to determine the position at which a lane change maneuver to use a next exit can be carried out.

Furthermore, in a development of the method, when determining whether it is possible for the vehicle to carry out the automated lane change maneuver at a particular position given a current traffic volume,
    weather conditions in a vehicle environment
    visibility conditions in the vehicle environment,
    obstructions in the vehicle environment and/or
    dynamic traffic information
are taken into account. The determined position is thus adjusted depending on environmental conditions of the vehicle so that a safe and comfortable lane change maneuver can be carried out.

In addition, in one embodiment, a capacity requirement for probable exit processes is determined specifically for each exit using data of the vehicle fleet, and the position for the initiation of the lane change maneuver is adjusted depending on the determined capacity requirement.

Exemplary embodiments of the invention are explained in more detail in the following with reference to a drawing.

BRIEF DESCRIPTION OF THE SOLE DRAWING FIGURE

Here:
The sole FIGURE schematically shows a section of road of a motorway in the region of an exit.

DETAILED DESCRIPTION

The sole FIGURE shows an aerial view of a section of road F of a motorway in the region of an exit A.

The section of road F comprises an inner lane F1, a central lane F2 and an outer lane F3, which is a right lane in right-hand traffic and a left lane in left-hand traffic.

A vehicle 1 driving in the automated driving mode, in particular in the autonomous driving mode, is located in the central lane F2, while a column of heavy goods vehicles 2 is driving in the outer lane F3.

Such a column of heavy goods vehicles 2 driving comparatively closely one behind the other and a comparatively high traffic volume, for example in evening rush-hour traffic and/or in metropolitan regions, often limit the possibility of the vehicle 1 carrying out a lane change maneuver from the central lane F2 to the outer lane F3, such that in some circumstances, the vehicle 1 cannot exit the motorway at this exit A. In particular, in the current situation at an exit A with a relatively sharp incline, a lane change maneuver is barely or not at all possible.

A vehicle 1 driving in automated driving mode requires a sufficiently large time gap to carry out a lane change maneuver to be able to carry out the lane change maneuver relatively safely and comfortably. A sufficiently large time gap does not exist due to such columns of heavy goods vehicles 2 driving closely one behind the other.

To make it possible for the automated vehicle 1 to carry out a lane change maneuver comparatively safely and comfortably, in particular to exit the motorway, a method to provide a solution is described in the following.

The automated vehicle 1 and further vehicles not depicted in more detail belong to a shared vehicle fleet, for example of a vehicle manufacturer, and are coupled to a central computer 3 for data exchange.

The vehicle 1 and the further vehicles send their respective current position, including the lane F1 to F3 they are currently driving in, to the central computer 3 at regular time intervals.

The central computer 3 is furthermore coupled to a navigation service 4 for data exchange, wherein as an alternative or in addition, the central computer 3 can also be connected to a traffic service. The central computer 3 receives traffic data that represents a respective local traffic volume, for example for the section of road F.

The method provides that the risk of a missed exit can be significantly reduced using a spatial-temporal investigation of lane change maneuvers of other automated vehicles connected to the central computer 3 at exits A on motorways, wherein safety and driving comfort when carrying out the lane change maneuver can be increased. In particular, the method provides that a spatial-temporal position for a lane change maneuver of the automated vehicle 1 can be dynamically determined using available lane change data and traffic data. The lane change data of the further vehicles contains lane change location information and lane change success information.

Leaving the motorway via an exit A can be implemented for a respective automated vehicle 1 by the vehicle 1 merging into the outer lane F3 comparatively early for example. Such early positions for initiating a lane change maneuver, e.g., from the central lane F2 to the outer lane F3, can be recorded using lane change data that other automated vehicles transmit to the central computer 3. In particular, successfully carried out lane change maneuvers are taken into account for this purpose, wherein the other vehicles have left the motorway via the exit A without a driver intervention.

In addition, the position for initiating an automated lane change maneuver can be determined using transmitted data of a vehicle fleet, at which position an occupant of the vehicle 1, i.e., a driver, usually switches to the outer lane F3 to use the exit A.

Due to technical constraints of an automated vehicle 1, the position for initiating the lane change maneuver can also be specified at a parameterizable larger distance, for example of 300 m from the exit A.

In order to carry out the method, a destination of the automated vehicle 1 is available to the central computer 3, so that it is known at which exit the vehicle 1 must exit the motorway. As described above, traffic data is additionally available to the central computer 3, which data represents a traffic volume in the traffic network, and thus also on the section of road F.

In addition, the central computer 3 receives lane change data about planned and successfully carried out automated lane change maneuvers from the other automated vehicles of the vehicle fleet. A beginning of a respective lane change maneuver is, in particular, recognized by a direction of travel indicator of the respective further vehicle being set. In particular, a location at which the lane change maneuver of the other automated vehicle is initiated is transmitted as lane change location information to the central computer 3 by means of the lane change data. An intention to carry out a lane change maneuver is indicated to traffic participants in an environment of the respective other automated vehicle by the direction of travel indicator being set.

A lane change maneuver carried out successfully by another vehicle in the region of the exit A, i.e., at the exit A, is respectively transmitted by the latter to the central computer 3 as lane change success information. The lane change success information is a component of the lane change data.

Using the present traffic data and lane change data of the other vehicles, a probability is then determined of it being possible for the vehicle to carry out an automated lane change maneuver at a particular position, for example at a pre-determined distance from the exit A. In other words, the position determined using a satellite for initiating the lane change maneuver of the vehicle 1 is determined using the temporal-spatial distribution of the successfully carried out lane change maneuver. In this position, the lane change maneuver can be successfully carried out with a parameterizable probability before an exit A of the motorway.

Positions at which an unsuccessfully carried out lane change maneuver has been initiated can additionally be used to determine the position for future lane change maneuvers, for example by initiating the lane change maneuver 50 m earlier. This approach is, in particular helpful, if there is not yet any usable lane change success information available.

In an alternative embodiment, a most probable merging position in the outer lane F3 can be determined from data of a vehicle fleet at exits A from motorways, and this merging position can then be increased for automated vehicles 1 by a parameterizable distance from the exit, for example by 300 m.

In one possible embodiment of the method, the parameterization of the probability and the merging position can be implemented depending on the current traffic volume. Thus, at a comparatively very high traffic volume, a lane change maneuver initiated at an earlier point in time is logical. This can be established, for example, depending on the traffic phase, in particular according to the three-phase traffic theory. For example, the lane change maneuver is initiated in free-flowing traffic, e.g., 200 m before the exit A, in synchronized traffic due to an increased traffic density, e.g., 600 m before the exit A, and in a long traffic jam as a traffic phase, e.g., 400 m before the exit A, because larger time gaps occur here at random every now and then.

Using data of the vehicle fleet, and also, for example, using the lane change data, a capacity requirement for probable exit maneuvers is established specifically for each exit A. In the event of a spatially-temporally increased capacity requirement, for example in evening rush hour and/or at the beginning or end of holiday traffic, the position for the initiation of the lane change maneuver can be shifted upstream by a parameterizable distance. A controlled traffic flow can thus be achieved. In addition, further parameters, for example current weather conditions, visibility conditions, obstacles in neighboring lanes, and/or dynamic traffic information can be taken into account when determining the position for initiating the lane change maneuver in order to exit the motorway comfortably and without danger.

The use of the method is in particular suitable for vehicles 1 of a vehicle fleet, wherein information for carrying out a lane change maneuver on a motorway to exit from the motorway can also be made available to other vehicle fleets, sometimes for a fee.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the FIGURES enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method of planning a lane change maneuver from one lane to an outer lane to prepare for an approaching exit from a multi-laned section of road for an automated vehicle, wherein the vehicle is coupled to or is couplable to a central computer to exchange data, the method comprising:
   receiving, by the central computer, traffic data representing a local traffic volume on the multi-laned section of road;
   receiving, by the central computer from other automated vehicles of a vehicle fleet, lane change data about planned and successfully carried out automated lane change maneuvers; and
   determining, by the central computer using the received traffic data and the received lane change data, a probability of the vehicle being able to carry out an automated lane change maneuver at a particular position given a current traffic volume,
   wherein the lane change data transmitted from the other automated vehicles of the vehicle fleet to the central computer contains lane change location information and lane change success information,
   wherein a location at which the lane change maneuver of the other automated vehicle of the vehicle fleet was initiated is specified by the lane change location information, wherein whether the lane change maneuver of the respective other automated vehicle of the vehicle fleet was carried out successfully or had to be terminated prematurely is specified by the lane change success information, wherein the method further comprises receiving, by the vehicle from the central computer, the particular position; and autonomously attempting, by the vehicle, to change from a current lane to an outer lane at the particular position.

2. The method of claim 1, wherein initiation of a lane change maneuver is recognized by a direction of travel indicator of the automated vehicle being set.

3. The method of claim 2, wherein a current position of the automated vehicle at a point in time at which the direction of travel indicator is set is recorded and is transmitted to the central computer.

4. The method of claim 1, wherein the traffic data is transmitted to the central computer by a traffic service or a navigation service.

5. The method of claim 1, wherein when determining whether it is possible for the vehicle to carry out the automated lane change maneuver at the particular position given a current traffic volume, at least one of the following is taken into account
   weather conditions in a vehicle environment,
   visibility conditions in the vehicle environment,
   obstructions in the vehicle environment, or
   dynamic traffic information.

6. The method of claim 1, wherein a capacity requirement for probable exit processes is determined specifically for each exit using data of the vehicle fleet.

7. A method of planning a lane change maneuver from one lane to an outer lane to prepare for an approaching exit from a multi-laned section of road for an automated vehicle, wherein the vehicle is coupled to or is couplable to a central computer to exchange data, the method comprising:
   receiving, by the central computer, traffic data representing a local traffic volume on the multi-laned section of road;
   receiving, by the central computer from other automated vehicles of a vehicle fleet, lane change data about planned and successfully carried out automated lane change maneuvers; and
   determining, by the central computer using the received traffic data and the received lane change data, a probability of the vehicle being able to carry out an automated lane change maneuver at a particular position given a current traffic volume, wherein the lane change data transmitted from the other automated vehicles of the vehicle fleet to the central computer contains lane change location information and lane change success information, wherein a location at which the lane change maneuver of the other automated vehicle of the vehicle fleet was initiated is specified by the lane change location information, wherein whether the lane change maneuver of the respective other automated vehicle of the vehicle fleet was carried out successfully or had to be terminated prematurely is specified by the lane change success information, wherein a capacity requirement for probable exit processes is determined specifically for each exit using data of the vehicle fleet, and wherein the particular position for the lane change maneuver is adjusted depending on the determined capacity requirement.

8. The method of claim 7, wherein initiation of a lane change maneuver is recognized by a direction of travel indicator of the automated vehicle being set.

9. The method of claim 8, wherein a current position of the automated vehicle at a point in time at which the direction of travel indicator is set is recorded and is transmitted to the central computer.

10. The method of claim 7, wherein the traffic data is transmitted to the central computer by a traffic service or a navigation service.

11. The method of claim 7, wherein when determining whether it is possible for the vehicle to carry out the automated lane change maneuver at the particular position given a current traffic volume, at least one of the following is taken into account
    weather conditions in a vehicle environment,
    visibility conditions in the vehicle environment,
    obstructions in the vehicle environment, or
    dynamic traffic information.

* * * * *